Jan. 31, 1933.    C. H. LAND ET AL    1,895,762
MEANS FOR COUPLING TRAILERS TO A TRACTOR
Filed March 3, 1932    2 Sheets-Sheet 1
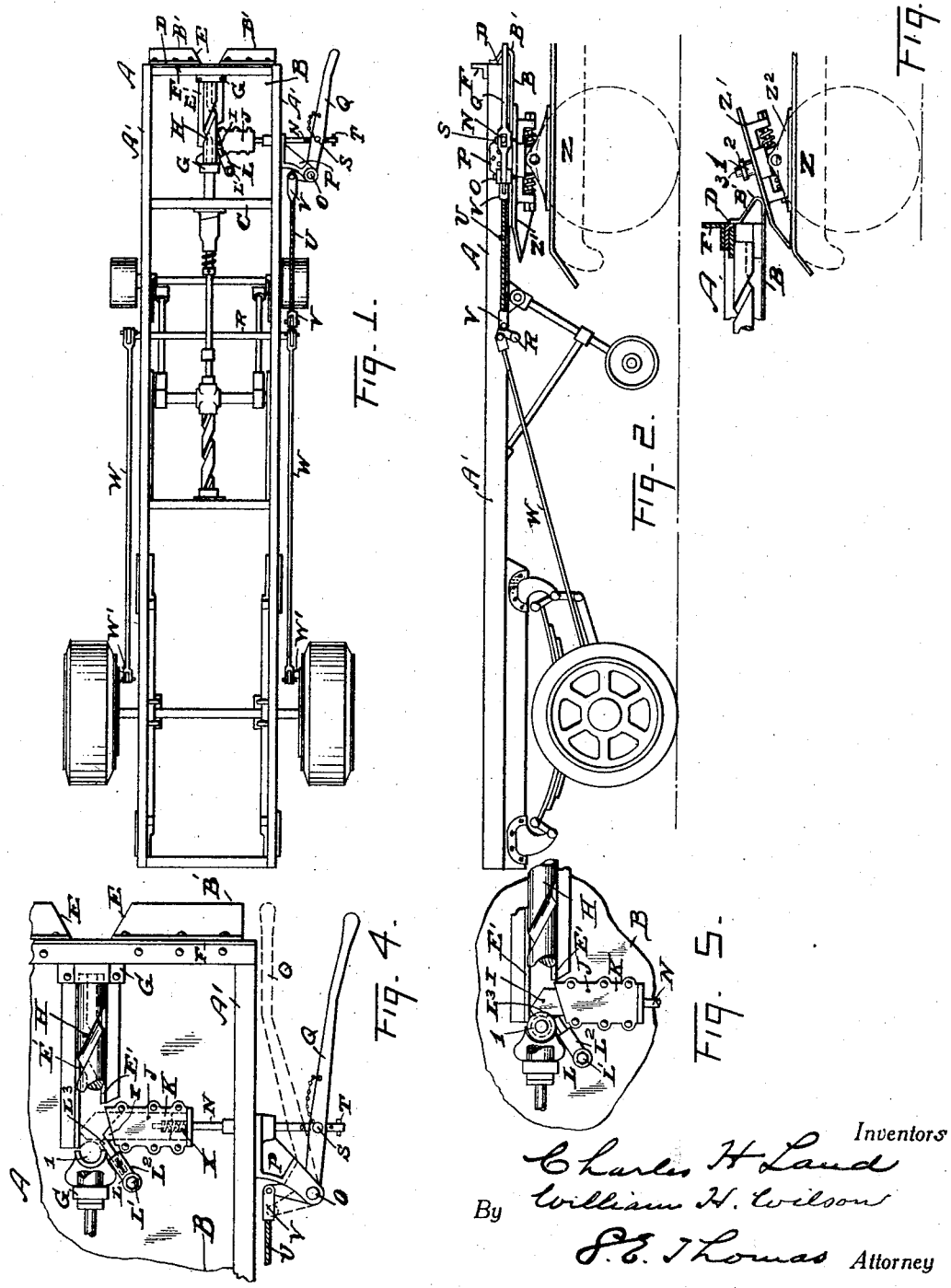
Inventors
Charles H. Land
William H. Wilson
By    J. E. Thomas    Attorney

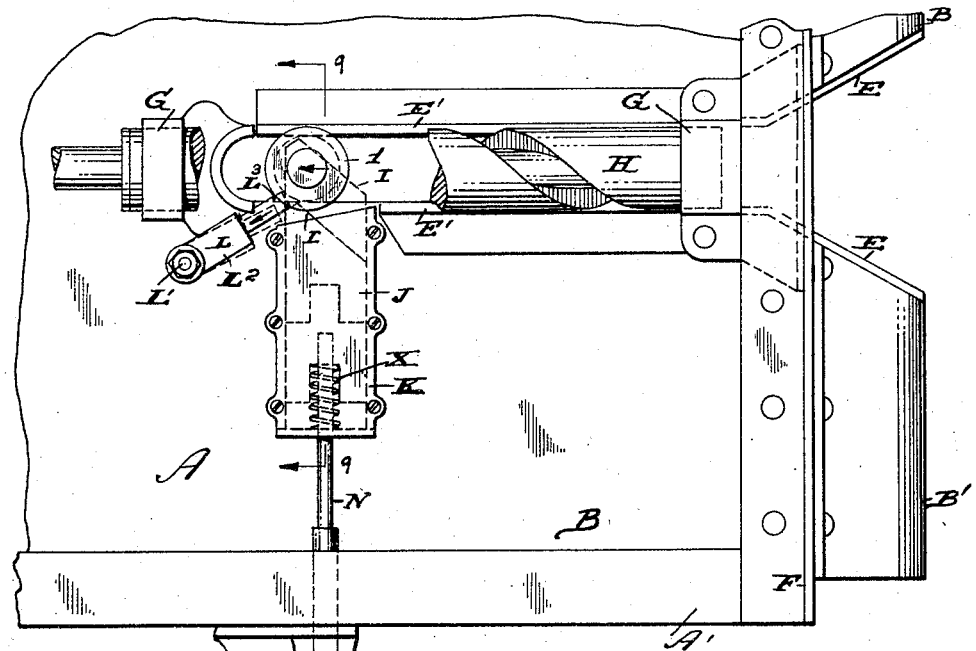
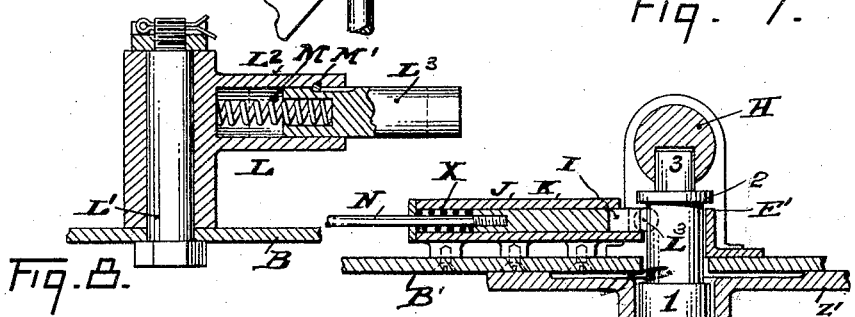
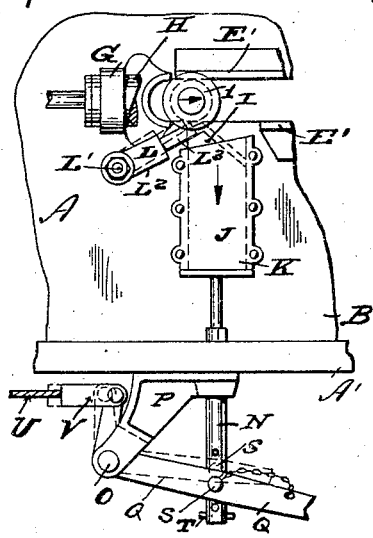

Patented Jan. 31, 1933

1,895,762

UNITED STATES PATENT OFFICE

CHARLES H. LAND, OF GROSSE POINTE, AND WILLIAM H. WILSON, OF DETROIT, MICHIGAN

MEANS FOR COUPLING TRAILERS TO A TRACTOR

Application filed March 3, 1932. Serial No. 596,519.

This invention relates to means for coupling trailers to a tractor and has for is object an improved automatic coupler for this purpose.

A further object of the invention is to provide a lock that may be retracted to release the tractor from the trailer, which may be maintained in an unlocked condition until again coupled with a tractor.

Another object of the invention is to provide the trailer with a cooperating lock and brake mechanism, whereby the brakes may be set when the lock is retracted for the purpose of disengaging the trailer,—the brakes remaining set until released by another coupling operation.

A further object of this invention is to provide a cooperating lock and brake mechanism, combined with an auxiliary brake releasing device, that may be used when the lock is in a retracted position with normally set brakes.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a plan view of a trailer showing a swinging leg controlling mechanism in normal position with the brakes set ready for coupling to a hauling vehicle.

Figure 2 is a side elevation of a trailer coupled to a tractor,—a fragmentary end of the latter being shown,—with the swinging supporting legs of the trailer in raised position.

Figure 3 is a diagrammatic fragmentary side elevation of a tractor and trailer, showing the fifth wheel of the tractor tilted,—carrying an upstanding king-pin about to enter into coupling relation with the trailer.

Figure 4 is an enlarged fragmentary plan view of the trailer shown in Figure 1, with parts broken away to more clearly disclose the operation of the locking latch for engaging the coupling king-pin of the tractor,— also means for retaining the locking latch in unlocked position until automatically released by the entry of the king-pin in the spiral groove of a driving shaft carried by the trailer,—controlling the raising and lowering of the supporting legs of the latter.

Figure 5 is a fragmentary plan view of the leg controlling mechanism disclosed in the preceding figure,—with the king-pin of the tractor seated and locked by the latch mechanism, as when trailer and tractor are coupled together.

Figure 6 is an enlarged fragmentary view of the trailer showing the king-pin of the tractor as it bears upon the swinging pawl to compress the locking latch and to additionally set the brake mechanism,—upon releasing the tractor from the trailer.

Figure 7 is a fragmentary plan view on an enlarged scale of the swinging leg and latch locking and controlling mechanism of the trailer, showing the king-pin of the tractor forcing back the rocking spring actuated dog, controlling the release of the locking latch, upon entering into coupling relation with the trailer.

Figure 8 is a detail view in vertical cross-section of the swinging pawl mechanism, controlling the king-pin latch lock and brake setting mechanism.

Figure 9 is a fragmentary cross-sectional view taken on or about line 9—9 of Figure 7, showing a fragment of the fifth wheel of a tractor, with the end of the king-pin extending into the groove of the helical shaft controlling the operation of the swinging leg mechanism of the trailer.

Referring now to the reference characters placed upon the drawings:

A denotes a trailer and Z the rear end of a tractor.

$A^1$ $A^1$ denote the side channel members of the trailer.

B B denote plates riveted to the lower flanges of the side channel members $A^1$ $A^1$ extending to the forward end of the trailer at which point the plates are bent upwardly forming arc-shaped skids $B^1$, welded to the front cross-member D.

E E indicate throat plates welded to the plates B B.

F indicates an angle member, riveted to the forward end member of the frame.

G G denote bearings for a spirally grooved drive shaft H. I denotes a wedge-shaped locking latch slidable in a housing J, attached to the plate B, and fitted with a removable cover plate K.

N denotes a pull-rod screwed into the end of the latch-bolt I, and extending through the latch housing,—a hole in the frame,—and a lug on the bracket P, attached to the frame.

Yoked to the pull rod N, is a bell crank lever Q, pivoted at O in a yoke of the bracket P.

S denotes a removable pin for connecting the bell crank lever Q with the pull-rod N, through a plurality of spaced holes, respectively adapted to receive the removable connecting pin S, for setting the brake and the retraction of the latch.

T denotes a transverse stop pin to retain the lever Q that it may not be accidentally released from the pull rod N.

U denotes a cable fitted at each end with yokes V respectively connected with the bell crank lever Q, and a rock shaft R, journaled in the frame of the machine.

W W are brake rods connecting the rock-shaft R with suitable braking mechanism $W^1$ $W^1$, not shown in detail.

X is an expansion spring coiled around the shaft N,—located between, and bearing respectively against the latch and the end of its housing.

L denotes a swinging pawl pivoted at $L^1$ to the plate B, consisting of a cylindrical housing $L^2$, bored to receive the pawl-bolt $L^3$. The pawl-bolt $L^3$ is recessed to receive a coiled spring M. $M^1$ is a pin to limit the outward thrust of the pawl bolt by the spring M.

The numeral 1 denotes the upstanding king-pin of a tractor mounted on a tilting table or fifth-wheel $Z^1$, in turn pivoted to bracket fixtures $Z^2$ secured to the rear end of the tractor.

Having now indicated the several parts by reference characters, the construction and operation of the device will be readily understood:

It will first be assumed that the tractor and trailer are in coupled relation and that it is desired to release or uncouple the tractor from the trailer;—to accomplish this, the lever Q is pulled sufficiently to retract the latch I to a position where the spring actuated bolt $L^3$ of the swinging pawl L may slide over the beveled end of the latch.

The lock is thus held in a retracted position that the tractor may be disengaged from the trailer. It will be noted that the swinging pawl L can swing only in a limited arc in one direction.

In Figure 6 it is shown overlapping the beveled end of the latch I and into the path of the king-pin when withdrawn from coupling relation with the trailer. When in this condition, upon withdrawing the tractor from the trailer, the king-pin 1 forces the pawl out of the channel passage, and the locking latch I to a further degree, thereby causing a slight increase in the brake setting action,—desirable when the tractor is getting under headway to lower the supporting legs of the trailer. After the king-pin has passed the latch I, the swinging pawl L still retains the locking latch in its previously retracted position.

At the time the lever Q is pulled to release the tractor, the bell-crank end of the lever moves from the dotted position indicated in dotted lines in Figure 6 to the full line position, thereby setting the "so-called" parking brakes,—coincidently with the release of the locking latch I,—which are thus differentiated from the usual power brakes—not shown.

Upon the withdrawal of the tractor, the upstanding drive pin 3 of the king bolt rotates the helical shaft to lower the supporting legs of the trailer in a manner well understood in this art.

When it is desired to couple the trailer to a tractor, the tractor is backed under the trailer in the usual manner, whereupon the upstanding king-pin 1 enters the side flares E E at the throat of the trailer.

Upon swinging the trailer into proper alignment, the projecting rim 2 of the king-pin overlaps the upright edges of the guides $E^1$ $E^1$,—see Figure 9,—bounding the channel extending inwardly from the flaring throat. This prevents the trailer jumping vertically out of position before the drive pin 3 enters the straight longitudinal end of the spirally grooved drive shaft H. The drive pin upon entering the spiral portion of the groove rotates the shaft and as the king-pin reaches and is about to enter the straight groove at the end of its travel, it engages the bolt $L^3$ of the swinging pawl L— see Figure 7— which normally projects a short distance into the channel.

The spring actuated bolt $L^3$ of the swinging pawl L cannot project further into the path of the king-pin due to the stop pin $M^1$—see Figure 8—it is however forced back against the action of the spring X by the inward thrust of the king-pin 1, when the latter is about to enter into coupling relation with the trailer, thereby releasing the wedge-shaped locking latch I from the control of the pawl.

As the king-bolt passes the end of the locking latch, the latter is shot outwardly by the spring X, locking the king bolt of the tractor in coupling relation with the trailer as indicated in Figure 5 of the drawings.

It will be noted that simultaneously with the release of the locking latch I from the control of the pawl L, the king bolt 1 of the tractor is locked by the latch in coupled relation with the trailer and that the parking brakes are also released as indicated by the position of the brake lever Q in dotted lines in Figure 4.

Having thus described our invention, what we claim is:

1. In an automatic coupling means for tractor-trailers, a king-pin carried by the tractor; means carried by the trailer to receive and guide the king-pin of the tractor into coupling relation with the trailer; a spring actuated latch carried by the trailer adapted to lock said king-pin in coupling relation with the tractor; means for retracting said latch; a spring actuated pawl projecting into the path of the king-pin adapted to overlap the end of the latch when retracted; a brake mechanism for the trailer; and means whereby the brake set may be increased and then partially released by the thrust of the king-pin upon the swinging pawl and latch in effecting an uncoupling engagement between the tractor and trailer.

2. In an automatic coupling means for tractor-trailers, a king-pin carried by the tractor; means carried by the trailer to receive and guide the king-pin of the tractor into coupling relation with the trailer; a spring actuated latch carried by the trailer adapted to lock said king-pin in coupling relation with the tractor; means for retracting said latch; a spring actuated swinging pawl projecting into the path of the king-pin adapted to overlap the end of the latch when retracted; a brake mechanism for the trailer; means for setting said brake; and means for increasing the breaking set of the brake mechanism actuated by the thrust of the king-pin on the swinging pawl and by the pawl through the latch, in effecting a release from the coupling relation of the tractor with the trailer.

3. In an automatic coupling means for tractor-trailers, a king-pin carried by the tractor; means carried by the trailer to receive and guide the king-pin of the tractor into coupling relation with the trailer; a spring actuated latch carried by the trailer adapted to lock said king-pin in coupling relation with the tractor; a manually operated bell-crank lever connected with said latch; a spring actuated swinging pawl projecting into the path of the king-pin and adapted to overlap the end of the latch when retracted by the lever; a brake mechanism for the trailer; and means connecting said brake mechanism with the bell-crank lever, whereby the thrust of the king-pin on the swinging pawl and through the latch to the bell-crank lever, in effecting a release from the coupling relation of the tractor with the trailer, rocks the bell-crank lever and thereby increases the brake set.

4. In an automatic coupling means for tractor-trailers, a semi-trailer equipped with legs movable to support the end of the trailer when detached from the tractor and to a non-supporting position when coupled to a tractor; a king-pin carried by the tractor; means carried by the trailer to receive and guide the king-pin into coupling relation with the tractor; a spring actuated latch carried by the trailer adapted to lock said king-pin in coupling relation; a manually operated bell-crank lever connected with said spring actuated latch; a brake mechanism; a rock shaft; a rod connecting said brake mechanism with the rock-shaft; a cable connecting said rock-shaft with the bell-crank lever; and a swinging spring actuated pawl, projecting into the path of the king-pin and overlapping the end of the spring actuated latch when retracted, whereby the latch may be maintained in a retracted position until automatically released to lock the king-pin in coupling relation with the trailer by the inward thrust of the king-pin against the pawl.

5. In an automatic coupling means for tractor-trailers, a semi-trailer equipped with legs movable to support the end of the trailer when detached from the tractor, and to a non-supporting position when coupled to a tractor; a king-pin carried by the tractor: means carried by the trailer to receive and guide the king-pin into coupling relation with the tractor; a brake mechanism; a spring actuated latch carried by the trailer adapted to lock said king-pin in coupling relation with the trailer; a manually operated bell-crank lever; a rod connecting said lever with the spring actuated latch; detachable means for connecting said lever with the rod, whereby the lever and rod may be adjustably connected to set the brakes and for manually releasing the brakes without releasing the latch when the trailer is detached from the tractor; a rock-shaft; a rod connecting said brake mechanism with the rock-shaft; a cable connecting said rock-shaft with the bell-crank lever; and a swinging spring actuated pawl projecting into the path of the king-pin and overlapping the end of the spring actuated latch to secure it in its retracted position until released by the king-pin in effecting a coupling relation with the trailer.

6. In an automatic coupling means for tractor-trailers, the combination of a semi-trailer equipped with legs movable to support the end of the trailer when detached from the tractor, and to a non-supporting position when coupled to a tractor; a king-pin carried by the tractor; means carried by the trailer to receive and guide the king-pin of the tractor into coupling relation with the trailer; a spring actuated latch carried by the trailer adapted to automatically lock the king-pin in coupled relation with the tractor; means for retracting said latch; a swinging pawl pivoted to the frame of the trailer; means for limiting the swinging movement of the pawl; a spring actuated bolt slidable in an arm of the pawl and projecting into the path of the king-pin that it may overlap the end of the latch when the latter is retracted; and means for limiting the outward thrust of the spring actuated bolt.

7. In an automatic coupling means for tractor-trailers, a king-pin carried by the tractor; means carried by the trailer to receive and guide the king-pin of the tractor into coupling position with the trailer; a lock carried by the trailer adapted to secure the king-pin of the tractor in coupling relation with the trailer at the end of the coupling stroke; a brake mechanism for the trailer; means for retracting the locking mechanism to release the trailer from the tractor and to simultaneously set the brake mechanism of the trailer; means projecting into the path of the king-pin adapted to maintain the lock in its retracted position and the brake mechanism set, until released by the thrust of the king-pin of the tractor upon again effecting a coupling engagement between the tractor and trailer.

8. In an automatic coupling means for tractor-trailers, a king-pin carried by the tractor; means carried by the trailer to receive and guide the king-pin of the tractor into coupling position with the trailer; means for locking the king-pin of the tractor in coupling relation with the trailer at the end of the coupling stroke; a brake mechanism for the trailer; means for retracting the locking mechanism to release the trailer from the tractor and to simultaneously set the brake mechanism of the trailer; and means for securing said locking mechanism in its retracted position and the brake mechanism in its set position until automatically and simultaneously released by the thrust of the king-pin of the tractor directly against the lock holding and brake control mechanism on entering into coupling relation with the trailer.

9. In an automatic coupling means for tractor-trailers, a king-pin carried by the tractor; means carried by the trailer to receive and guide the king-pin of the tractor into coupling position with the trailer; a lock carried by the trailer adapted to secure the king-pin of the tractor in coupling relation with the trailer at the end of the coupling stroke; a brake mechanism for the trailer; means for retracting the locking mechanism to release the trailer from the tractor and to simultaneously set the brake mechanism of the trailer; means projecting into the path of the king-pin and overlapping the lock when retracted, whereby the lock may be maintained in its retracted position until released by the thrust of the king-pin of the tractor upon again effecting a coupling engagement between the tractor and trailer.

10. In an automatic coupling means for tractor-trailers, a king-pin carried by the tractor; means carried by the trailer to receive and guide the king-pin of the tractor into coupling relation with the trailer; a lock for securing the king-pin of the tractor in coupled relation with the trailer; a brake mechanism for the trailer; means for retracting the lock and for simultaneously setting the brake mechanism of the trailer; and means for respectively maintaining the lock in retracted position and the brake mechanism in set position, until automatically released simultaneously with a transitory increase in the brake-set effected through the thrust of the tractor king-pin, upon uncoupling the tractor from the trailer.

11. In an automatic coupling means for tractor-trailers, the combination of a king-pin carried by the tractor; means carried by the trailer to receive and guide the king-pin of the tractor into coupling relation with the trailer; a lock and brake mechanism carried by the trailer; means for retracting the lock and setting the brake mechanism; means for maintaining the lock in retracted position and the brake mechanism in set position, until automatically released by the thrust of the tractor king-pin in effecting a coupling relation between the tractor and trailer; said king-pin upon uncoupling the tractor from the trailer serving to automatically and to simultaneously retract said lock mechanism and to transitorily increase the brake-set.

In testimony whereof, we sign this specification.

CHARLES H. LAND.
WILLIAM H. WILSON.